US010164506B2

(12) United States Patent
Kondo et al.

(10) Patent No.: US 10,164,506 B2
(45) Date of Patent: Dec. 25, 2018

(54) WINDING DEVICE AND WINDING METHOD

(71) Applicants: NITTOKU ENGINEERING CO., LTD., Saitama-shi, Saitama (JP); MITSUBA Corporation, Kiryu-shi, Gunma (JP)

(72) Inventors: Koji Kondo, Fukushima (JP); Ryo Kato, Fukushima (JP); Tetsuya Nara, Gunma (JP); Kenichi Aramaki, Gunma (JP)

(73) Assignees: NITTOKU ENGINEERING CO., LTD., Saitama-Shi, Saitama (JP); MITSUBA CORPORATION, Kiryu-Shi, Gunma (JP)

( * ) Notice: Subject to any disclaimer, the term of this patent is extended or adjusted under 35 U.S.C. 154(b) by 501 days.

(21) Appl. No.: 14/904,749

(22) PCT Filed: Jun. 20, 2014

(86) PCT No.: PCT/JP2014/066466
§ 371 (c)(1),
(2) Date: Jan. 13, 2016

(87) PCT Pub. No.: WO2015/015948
PCT Pub. Date: Feb. 5, 2015

(65) Prior Publication Data
US 2016/0172945 A1 Jun. 16, 2016

(30) Foreign Application Priority Data

Jul. 28, 2013 (JP) .................. 2013-156209

(51) Int. Cl.
H02K 15/09 (2006.01)
H02K 15/085 (2006.01)

(52) U.S. Cl.
CPC .......... *H02K 15/09* (2013.01); *H02K 15/085* (2013.01)

(58) Field of Classification Search
CPC ......................... H02K 15/085; H02K 15/09
See application file for complete search history.

(56) References Cited

U.S. PATENT DOCUMENTS

2015/0056054 A1* 2/2015 Kawano ............. H02K 15/0414
414/788.9

FOREIGN PATENT DOCUMENTS

EP           1294083 A2    3/2003
JP      2011-091885 A     5/2011
JP      2013-258822 A    12/2013

* cited by examiner

*Primary Examiner* — Sang K Kim
*Assistant Examiner* — Nathaniel L Adams
(74) *Attorney, Agent, or Firm* — Rabin & Berdo, P.C.

(57) ABSTRACT

A winding device including radially disposed nozzles of a same number as the number of teeth, a plurality of the nozzles simultaneously drawing out a wire to corresponding slots between respective teeth to simultaneously wind the wire between predetermined two slots that correspond to a respective one of the nozzles, includes a wire drawing and cutting mechanism configured to draw out the wire from a single spool and cut the drawn-out wire at a predetermined length, a wire storing mechanism configured to dispose the wire of the predetermined length obtained by the wire drawing and cutting mechanism in a radial manner and store the wire to a same number as that of the plurality of nozzles, and a wire conveyance mechanism configured to convey the radially disposed plurality of wires from the wire storing mechanism, to the plurality of nozzles.

5 Claims, 14 Drawing Sheets

WINDING DEVICE AND WINDING METHOD

TECHNICAL FIELD

The present invention relates to a winding device having a plurality of nozzles of the same number as that of the number of teeth to which a wire is wound, and a winding method for winding a wire to each teeth by the plurality of nozzles.

BACKGROUND ART

A brushless motor is an example of a motor that is conventionally installed in vehicles and the like. The brushless motor has a stator fixed inside a motor housing and a rotor provided rotatable in an inner radial direction of the stator. The stator and the rotor have a plurality of teeth formed thereon in a radially projecting manner, and between the teeth are formed slots that are opened inwards and outwards along the radial direction. Via these slots, wires are wound to the plurality of teeth by a concentrated winding method or a distributed winding method.

In order to achieve high efficiency and size reduction of the motor, it is effective to improve the space factor of the winding. The winding is carried out between two slots, and the wire, after being inserted into one of the slots, is folded over and inserted into the other one of the slots. At this time, if a crossover wire crossing over from one slot to the other slot expands out, the size reduction of the motor would become difficult.

JP2011-91885A discloses a winding device that disposes in radial positions a plurality of nozzles of the same number as the number of teeth to which a wire is wound, and the wire is simultaneously drawn out from the plurality of nozzles to corresponding slots between respective teeth to simultaneously wind the wire between predetermined two slots that correspond to that respective nozzle.

This winding device simultaneously draws out the wire from the plurality of nozzles. Thus, when a crossover line is formed, each of the crossover lines are pressed down towards the inner radial direction as the plurality of nozzles moves internally along the radial direction. This causes the crossover lines to tangle with each other while gradually displaced internally along the radial direction. As a result, the expansion of the crossover lines is prevented, which thus improves the space factor of the winding.

SUMMARY OF INVENTION

However, in the winding device disclosed in JP2011-91885A, a plurality of nozzles of the same number as the number of teeth is provided, and the wire is drawn out simultaneously from the plurality of nozzles to corresponding slots between respective teeth. This requires the same number of wire supply sources that supplies nozzles with wire as the number of the nozzles. Generally, the wire is stored in a state wound around a spool, and to wind this wire, there is the need to straighten the wire drawn out from the spool. Accordingly, the wire supply source requires at least the spool that the wire is wound around and a stretcher for stretching the wire straight. It is therefore necessary to dispose around the nozzles the spools on which the wire is wound and the stretchers, of a same number as that of the nozzles. This may cause the device to increase in size.

In particular, there are many cases in which stators and rotors for use in motors of a relatively large output have twenty or more number of teeth formed thereon. If twenty or more spools and stretchers are disposed around the nozzles being a number of twenty or more in order to wind the wires to these stators and rotors, the winding device itself would increase in size, and would require a relatively wide area for placement.

The object of the present invention is to provide a winding device and a winding method that is capable of reducing the number of spools and stretchers while still having a plurality of nozzles.

According to one aspect of the present invention, a winding device including radially disposed nozzles of a same number as the number of teeth, a plurality of the nozzles simultaneously drawing out a wire to corresponding slots between respective teeth to simultaneously wind the wire between predetermined two slots that correspond to a respective one of the nozzles is provided. The winding device includes a wire drawing and cutting mechanism configured to draw out the wire from a single spool and cut the drawn-out wire at a predetermined length, a wire storing mechanism configured to dispose the wire of the predetermined length obtained by the wire drawing and cutting mechanism in a radial manner and store the wire of the same number as that of the plurality of nozzles, and a wire conveyance mechanism configured to convey the radially disposed plurality of wires from the wire storing mechanism to the plurality of nozzles.

According to another aspect of the present invention, a winding method of simultaneously drawing out wires from a plurality of radially disposed nozzles of a same number as the number of teeth to a corresponding slot between respective teeth, and simultaneously winding the wires between predetermined two slots corresponding to respective nozzles is provided. The method includes a wire storage step of radially disposing wires of a predetermined length required for the winding and storing the wires of the same number as that of the plurality of the nozzles, while the wires are being wound, and a wire conveyance step of conveying a plurality of the wires stored in the wire storage step to the plurality of nozzles, after the wires are wound.

DESCRIPTION OF EMBODIMENTS

A winding device according to an embodiment of the present invention is described with reference to the drawings.

FIG. 1 to FIG. 11 show a winding device 20 according to the present embodiment. The winding device 20 according to the present embodiment shows a case in which a winding target is a rotor to be used in a motor.

Figure 12:
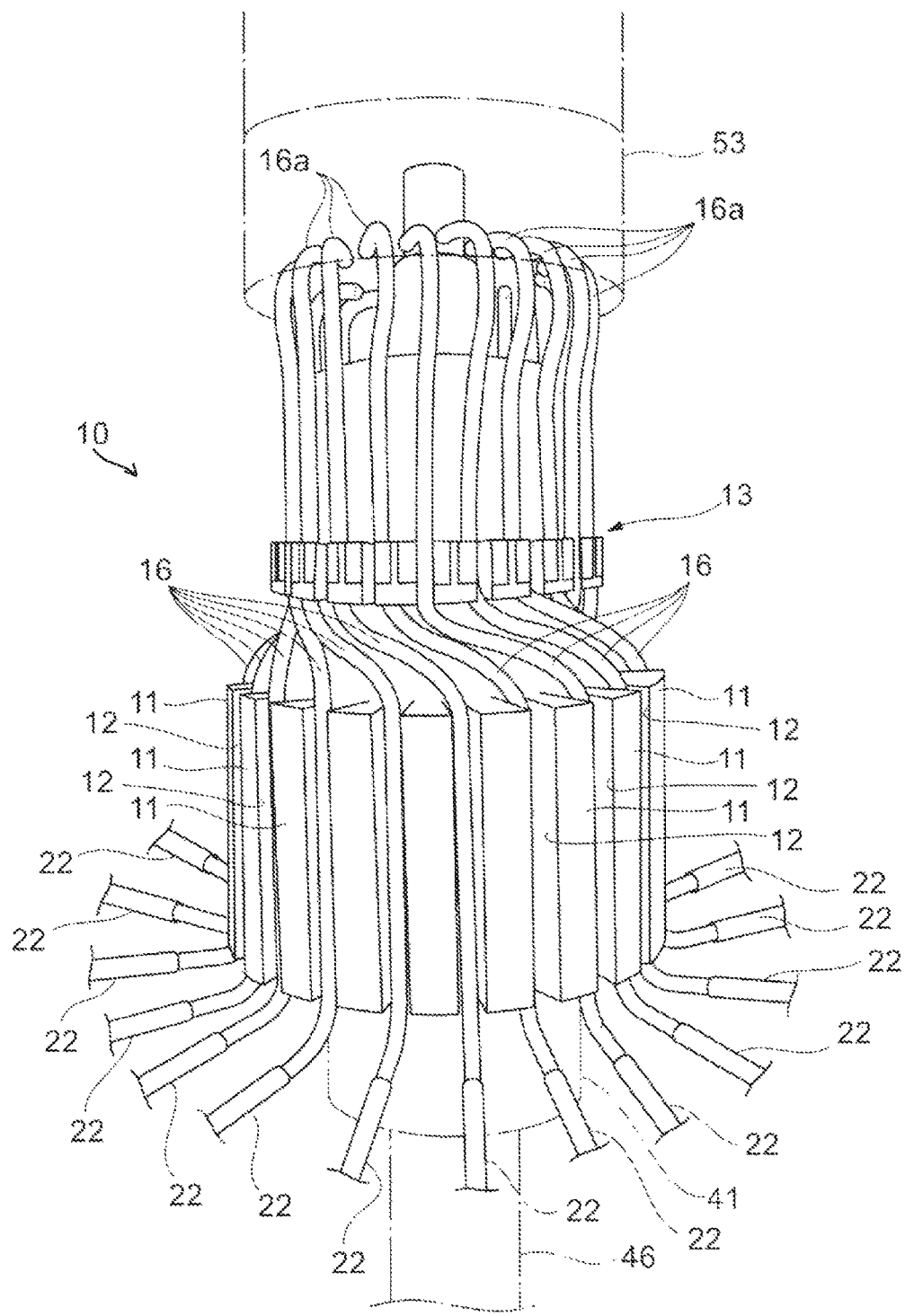
FIG. 12 is a perspective view of a rotor in which the wires are inserted into the slots by a winding device.
Figure 13:
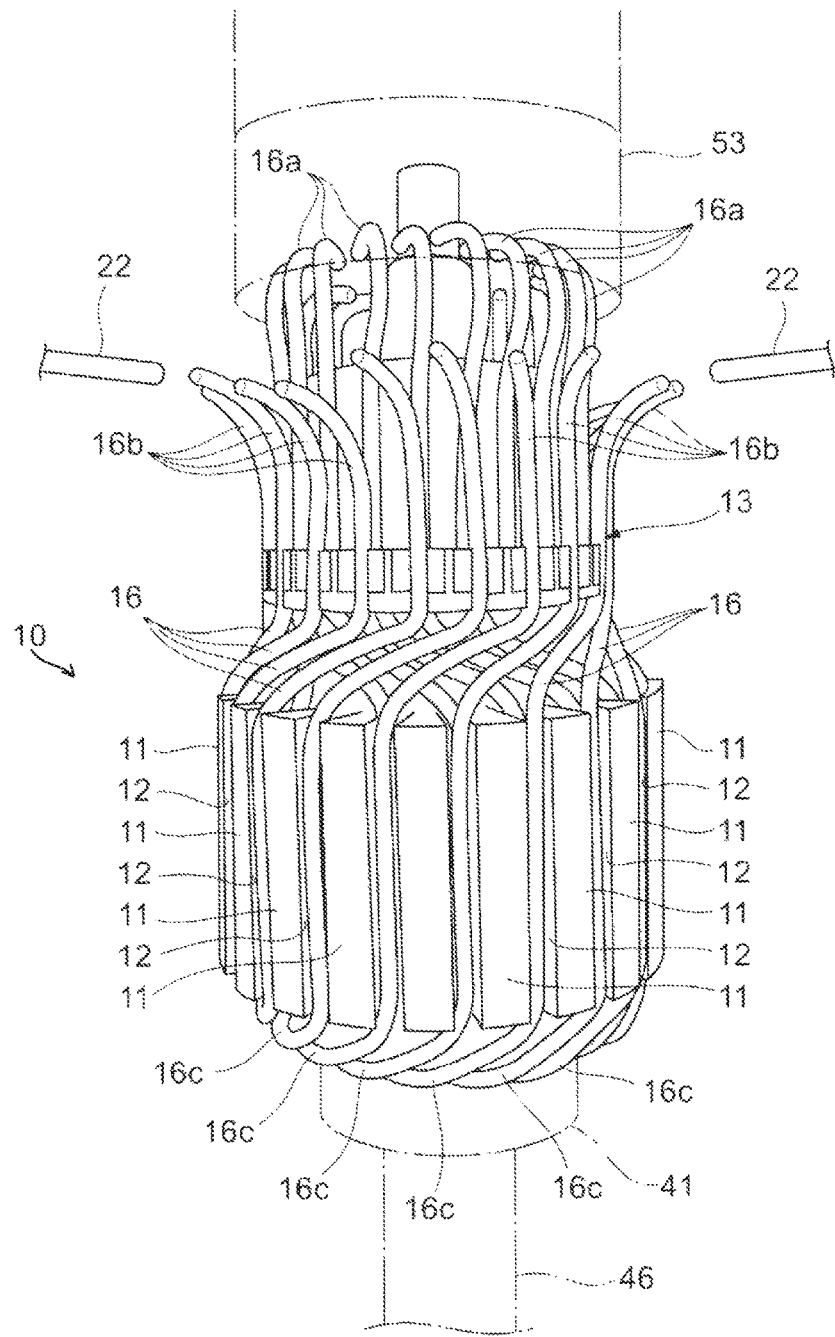
FIG. 13 is a view corresponding to FIG. 12, of the rotor in which the wires inserted inside the slots by the winding device are folded over and each of the wires are inserted into another slot to complete the winding.
Figure 14:
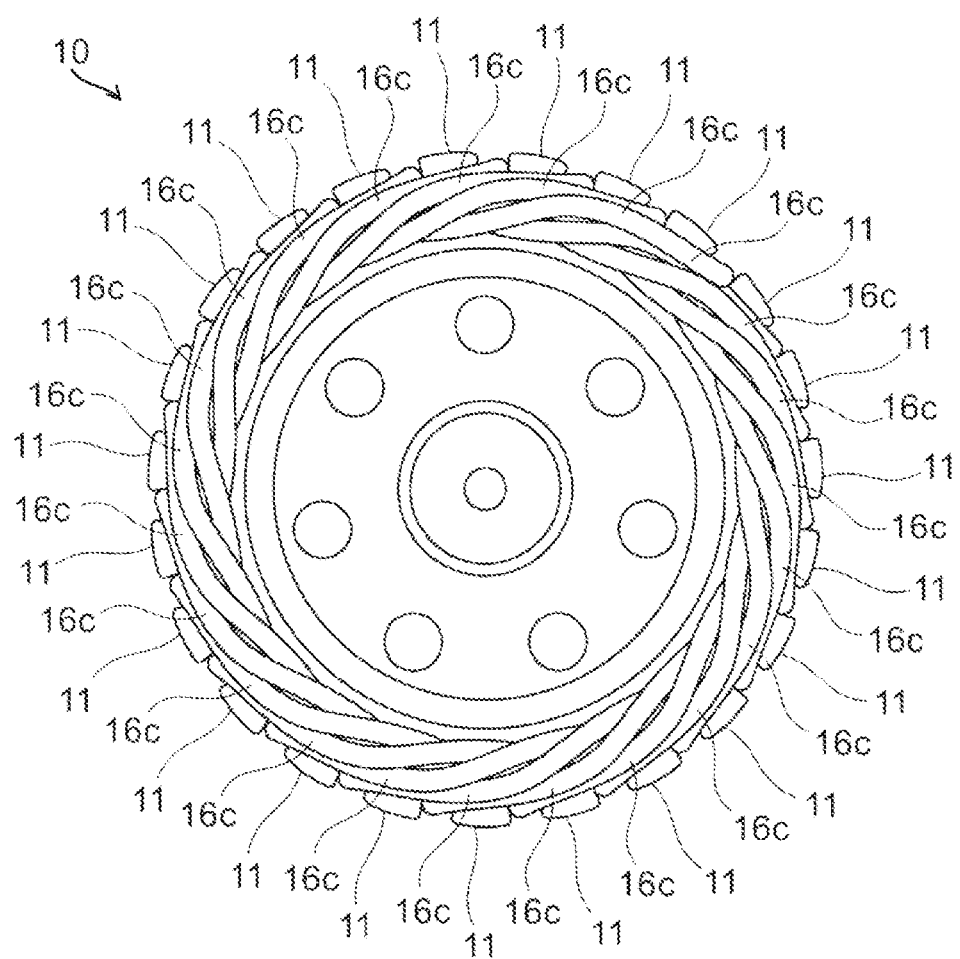
FIG. 14 is a bottom view showing a state of crossover lines of a rotor in which the winding is completed by the winding device.

As shown in FIG. 12 to FIG. 14, a rotor 10 has a plurality of teeth 11 provided in a radially projecting manner, and between the teeth 11, slots 12 that are each opened outwards in a radial direction are provided. The winding device 20 has a winding mechanism 21 that winds the wires 16 to the plurality of teeth 11 via the slots 12, a wire drawing and cutting mechanism 61 that draws out the wire 16 from a supply source of the wire 16 and cuts the wire 16 drawn out, a wire storing mechanism 71 that stores the wires 16 of a predetermined length obtained by the wire drawing and cutting mechanism 61, and a wire conveyance mechanism 81 that conveys the wires 16 stored in the wire storing mechanism 71 to the winding mechanism 21.

As shown in FIG. 1, FIG. 5 to FIG. 7, the winding mechanism 21 of the winding device 20 includes nozzles 22 of the same number as that of the teeth 11 of the rotor 10 being the winding target. In the present embodiment, the rotor 10 being the winding target has twenty or more teeth 11 disposed in a radial manner; the winding mechanism 21 thus includes twenty or more of the nozzles 22 arranged in radial positions.

The winding mechanism 21 includes a flat horizontal substrate 23 on which the plurality of nozzles 22 are arranged. The horizontal substrate 23 is supported by four supporting columns 24. The four supporting columns 24 are provided standing on a base plate 26, and the base plate 26 is provided with casters 27 for allowing movement of the winding mechanism 21 and fixing legs 28 for installation of the winding mechanism 21.

Figure 7:
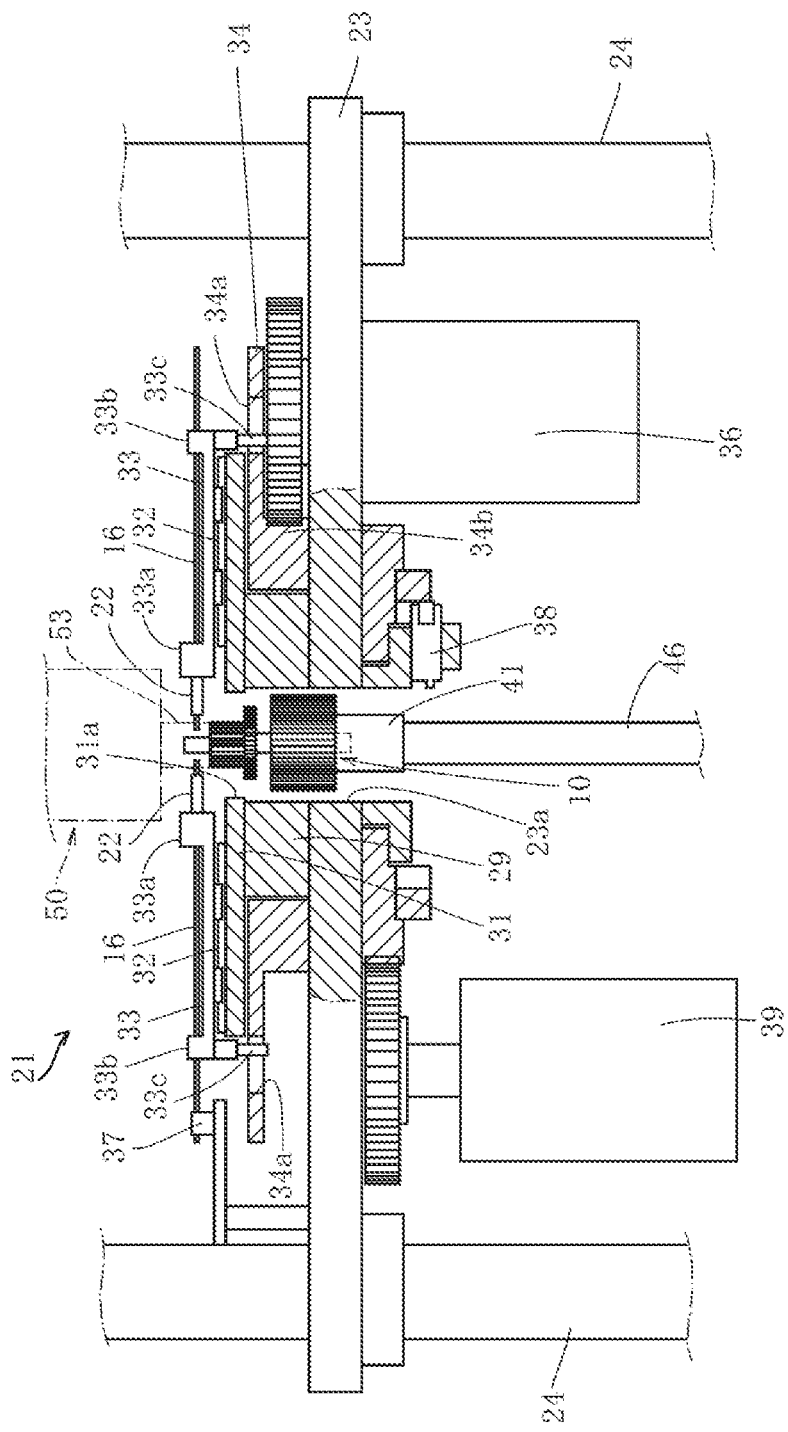
FIG. 7 is a cross sectional view taken along line VII-VII in FIG. 6.

As shown in FIG. 7, the horizontal substrate 23 has a center hole 23a formed on its substantially center, through which the rotor 10 to be wound can pass. The horizontal substrate 23 has a ring member 29 provided thereon, which ring member surrounds the center hole 23a. The ring member 29 has an annular attachment disk 31 attached thereon, which disk is parallel to the horizontal substrate 23. In the center of the attachment disk 31, a round hole 31a is formed that has the same axis as the center hole 23a of the horizontal substrate 23. The plurality of nozzles 22 are arranged above the attachment disk 31 in radial positions about the round hole 31a that serves as a center.

The attachment disk 31 has a plurality of rails 32 provided in radial positions, and movable stands 33 are provided on the rails 32 in a movable manner.

The movable stand 33 has an elongated shape along the rail 32, and has an inner edge 33a formed on a center side of the attachment disk 31 and a supporting section 33b formed on an outer circumferential side of the attachment disk 31. The nozzles 22 are provided on the inner edges 33a. The supporting section 33b is provided to support an intermediate part or a base end part of the wires 16 whose tip is inserted into the nozzles 22.

Figure 5:
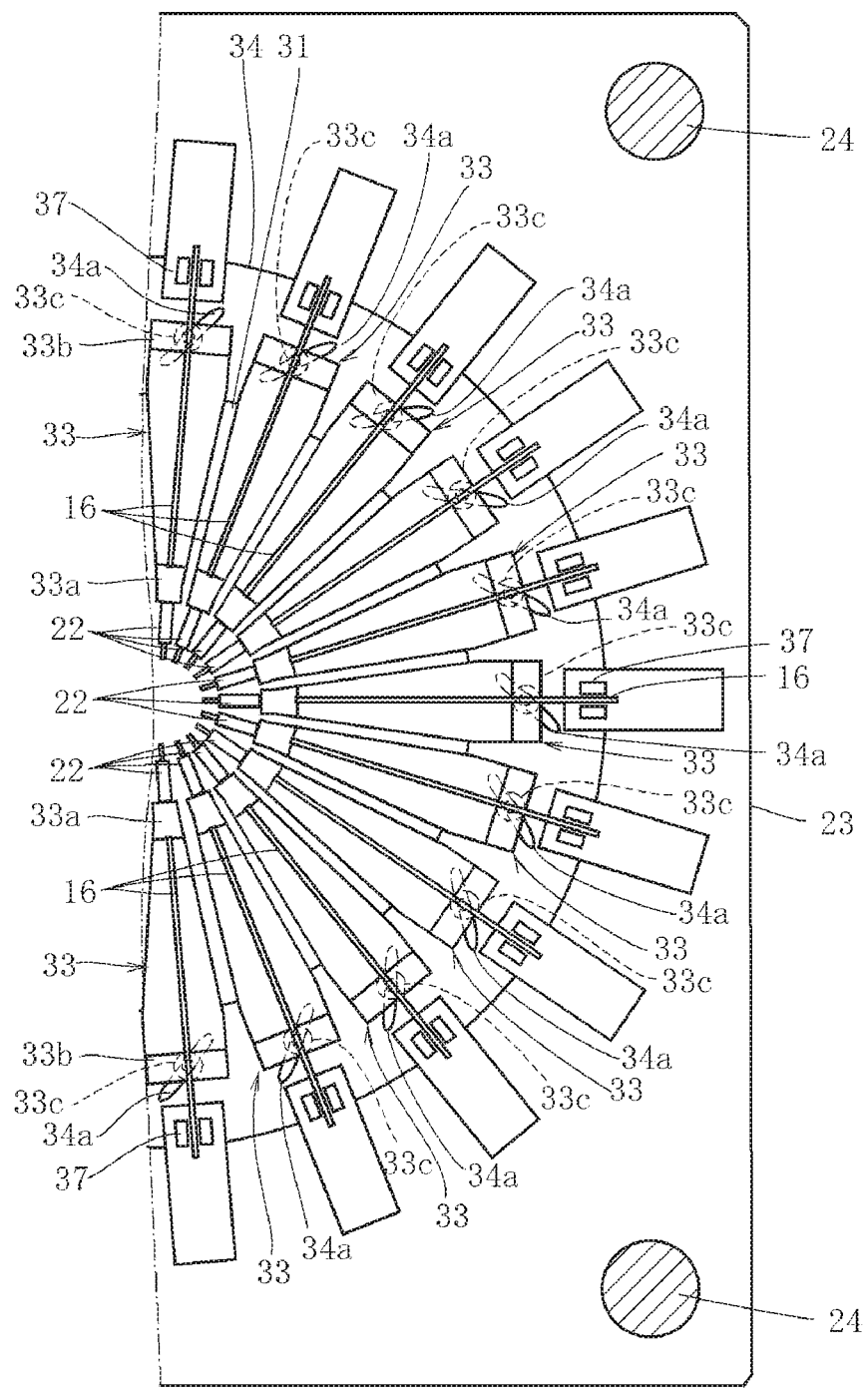
FIG. 5 is a cross sectional view taken along line V-V in FIG. 1, showing an arranged state of a plurality of nozzles.

A cam plate 34 is fitted on an outer circumference of the ring member 29. The cam plate 34 is rotatable within a horizontal plane about the round hole 31a of the attachment disk 31, which round hole 31a serves as the center of rotation. The supporting section 33b of the movable stand 33 is provided with a cam follower 33c that extends downwards from a lower edge of the supporting section 33b. The cam plate 34 has cam grooves 34a formed thereto, into which the cam follower 33c is inserted. As shown in FIG. 5, the number of the cam grooves 34a formed on the cam plate 34 is the same as that of the nozzles 22, and the cam grooves 34a are formed at intervals of equal angles in a circumferential direction having the round hole 31a serving as its center.

As shown in FIG. 7, the cam plate 34 has a spur gear 34b having the round hole 31a serve as its center. The horizontal substrate 23 is attached with a nozzle drive motor 36 that meshes with the spur gear 34b and that causes rotation of the cam plate 34 together with the spur gear 34b. When the cam plate 34 rotates by the nozzle drive motor 36, the cam follower 33c that is inserted into the cam groove 34a moves along the cam groove 34a. Accordingly, the plurality of movable stands 33 provided in radial positions moves toward the inner circumference or outer circumference simultaneously.

The members shown as reference signs 37 in FIG. 5 and FIG. 7 are sensors 37 that detect the presence of the wires 16, and are provided with the horizontal substrate 23 with respect to a corresponding movable stand 33. The member shown as reference sign 38 in FIG. 7 is a caulking member 38 that caulks a terminal mounting section of the rotor 10 wound with the wire 16, and is provided on a lower side of the horizontal substrate 23. The member shown as reference sign 39 in FIG. 7 is a caulking motor 39 that causes the caulking member 38 to operate.

Figure 1:
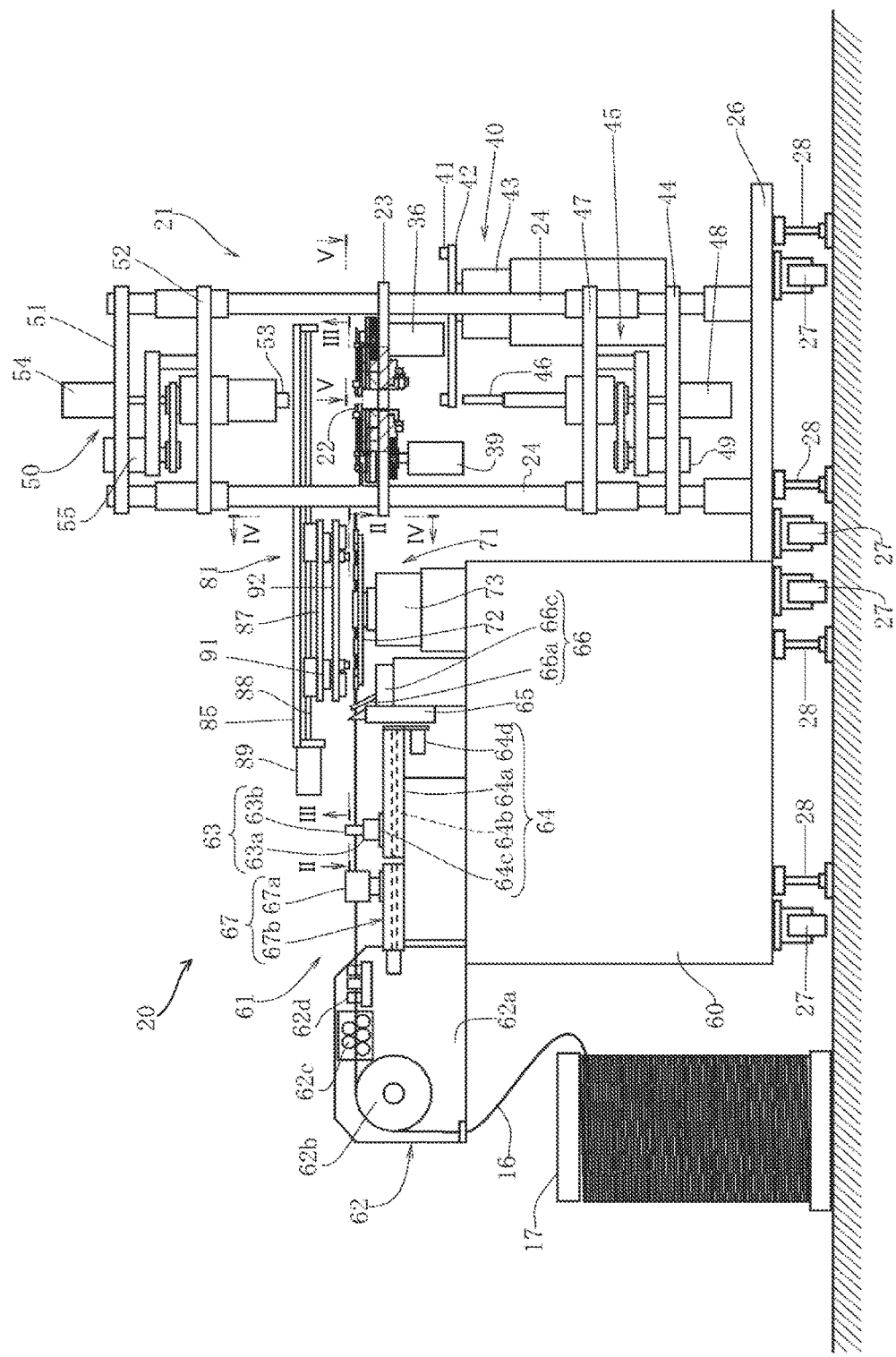
FIG. 1 is a front view of a winding device according to an embodiment of the present invention.
Figure 6:
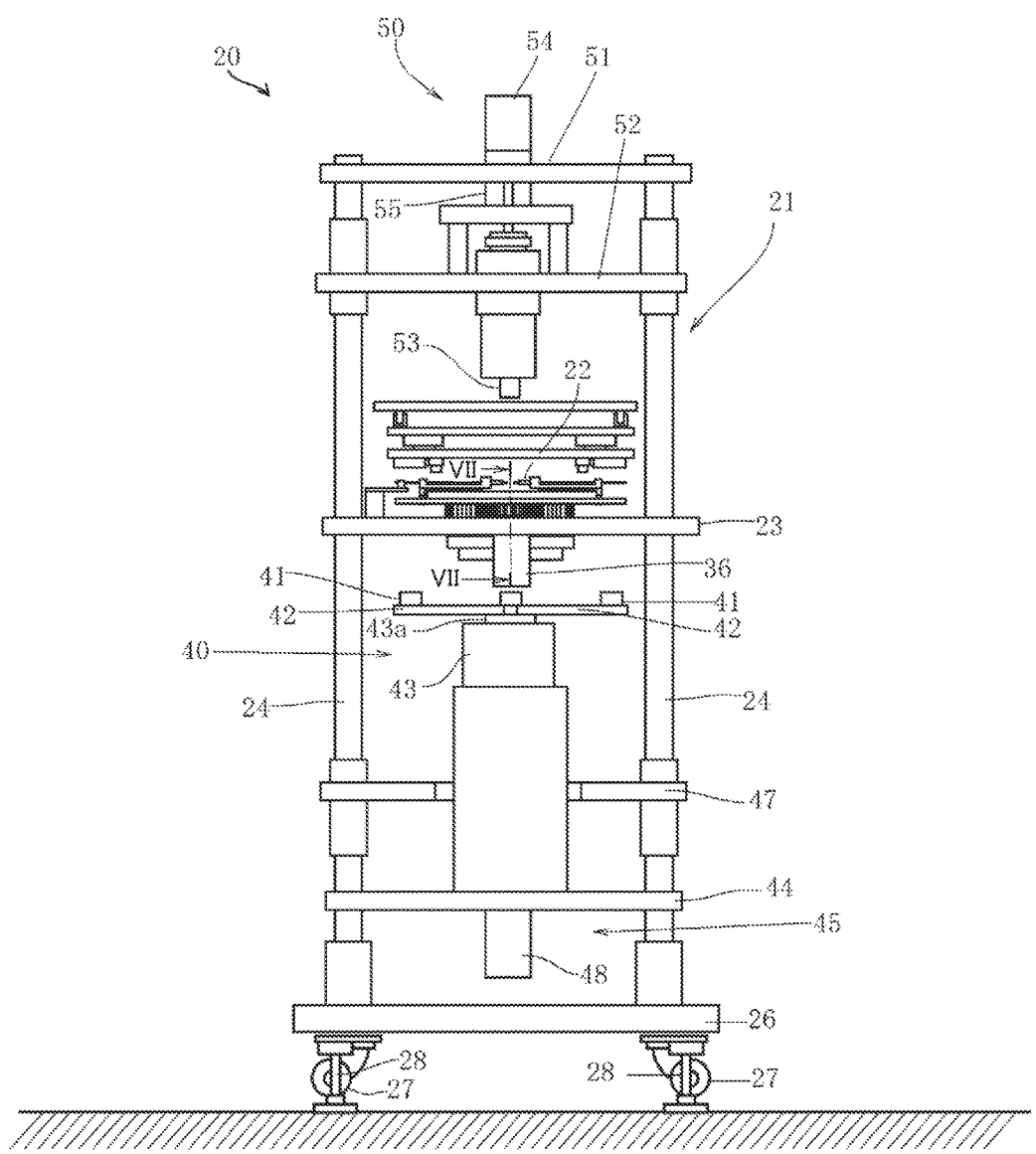
FIG. 6 is a side view of a winding device according to an embodiment of the present invention.

As shown in FIG. 1, FIG. 6 and FIG. 7, the winding mechanism 21 has a rotor carrying mechanism 40 that carries the rotor 10 to be wound to below the round hole 31a of the attachment disk 31, a rotor lift mechanism 45 that lifts and lowers the carried rotor 10, and a rotor supporting mechanism 50 that supports the upper part of the lifted rotor 10 and clips winding start sections 16a of the wires 16 (FIG. 12 and FIG. 13).

The rotor lift mechanism 45 includes a lifting rod 46 provided extending downwards in a perpendicular direction of the round hole 31a of the attachment disk 31, a pivot lift plate 47 that pivots at a lower part of the lifting rod 46 and is attached to the four supporting columns 24 in a vertically movable manner, a fixed plate 44 provided lower than the pivot lift plate 47 in a vertically immovable manner to the four supporting columns 24, a rod lifting motor 48 that is attached to the fixed plate 44 and that lifts and lowers the pivot lift plate 47 together with the lifting rod 46, and a rotary motor 49 that is attached to the pivot lift plate 47 and causes rotation of the lifting rod 46.

The rotor carrying mechanism 40 includes a support base 41 capable of supporting the rotor 10, and three arms 42 to which the support base 41 is detachably attached on one end thereof. The arms 42 are members of a stick form, and are arranged radially so that one end thereof faces outwards.

As shown in FIG. 6, the fixed plate 44 has a carrying motor 43 that carries the rotor 10 installed on one end of the arms 42 in a circumferential direction. The other end of the three arms 42 are attached to a rotational shaft 43a of the carrying motor 43.

The rotor carrying mechanism 40 causes the three arms 42 to rotate within the horizontal plane lower of the horizontal substrate 23 by the carrying motor 43, to carry the rotor 10 installed on the support base 41 below the round hole 31a of the attachment disk 31. The rotor lift mechanism 45 lifts the lifting rod 46 and supports the rotor 10 carried below the round hole 31a at an upper end of the lifting rod 46, together with the support base 41. As the lifting rod 46 is further lifted, the rotor 10 that is lifted together with the support base 41 passes through the round hole 31a.

The rotor supporting mechanism 50 includes a fixed base 51 attached to an upper end of the supporting column 24, a lift base 52 provided between the fixed base 51 and horizontal substrate 23 in a vertically movable manner with respect to the supporting column 24, a pressing member 53 that is pivoted by the lift base 52 and that presses the rotor 10 lifted by passing through the round hole 31a from above, a lift motor 54 attached to the fixed base 51 and which lifts and lowers the lift base 52, and a rotation motor 55 attached to the lift base 52 and which causes the pressing member 53 to rotate.

The pressing member 53 is provided with a clipping mechanism (not shown) that clips winding start sections 16a (FIG. 12 and FIG. 13) of all of the wires 16 drawn out from the plurality of nozzles 22.

As shown in FIG. 1, the winding device 20 includes the wire drawing and cutting mechanism 61 that draws out and cuts the wire 16 drawn out from the single spool 17 at a predetermined length. The spool 17 that is the supply source of the wire 16 has the wire 16 wound thereto and stored.

The wire 16 in the present embodiment is a coated lead wire, and a so-called round wire whose cross section is shaped as a circle is used. The wire 16 is not limited to this, and may also be a so-called square wire whose cross section is shaped as a square.

The wire drawing and cutting mechanism 61 includes a spool 17 that stores the wire 16, and a stretcher 62 that straightens the wire 16 drawn out from the spool 17.

A box base 60 is provided adjacent to the base plate 26 of the winding mechanism 21. The spool 17 is disposed in the vicinity of the box base 60 on the opposite side of the base plate 26.

The stretcher 62 includes a perpendicular plate 62a provided extending from the upper surface of the box base 60 to above of the spool 17, a deflection pulley 62b provided on the perpendicular plate 62a for deflecting the wire 16 drawn upwards from the spool 17 into a horizontal direction towards the winding mechanism 21, a perpendicular direction correction pulley 62c that sandwiches the wire 16 deflected into the horizontal direction from above and below to correct any bends in the perpendicular direction, and a horizontal direction correction pulley 62d that sandwiches the wire 16 deflected into the horizontal direction from both sides thereof in the horizontal direction to correct any bends in the horizontal direction. The box base 60 is provided with the casters 27 for movement thereof, and fixing legs 28 for installment of the box base 60.

The wire drawing and cutting mechanism 61 includes a chuck mechanism 63 that holds the wire 16 deflected towards the winding mechanism 21 and made straight by the stretcher 62, a wire transfer actuator 64 that causes the chuck mechanism 63 to move from the stretcher 62 side to the winding mechanism 21 side, and a nipper device 65 provided on an edge of the wire transfer actuator 64 on the winding mechanism 21 side to cut the wire 16.

The wire transfer actuator 64 has a housing 64a that extends from the stretcher 62 side to the winding mechanism 21 side, a screw shaft 64b provided extending in a longitudinal direction inside the housing 64a, a movable base 64c that screws to the screw shaft 64b and is movable in a longitudinal direction of the housing 64a, and a servomotor 64d that causes the screw shaft 64b to rotate. The chuck mechanism 63 is attached to the movable base 64c.

Figure 2:
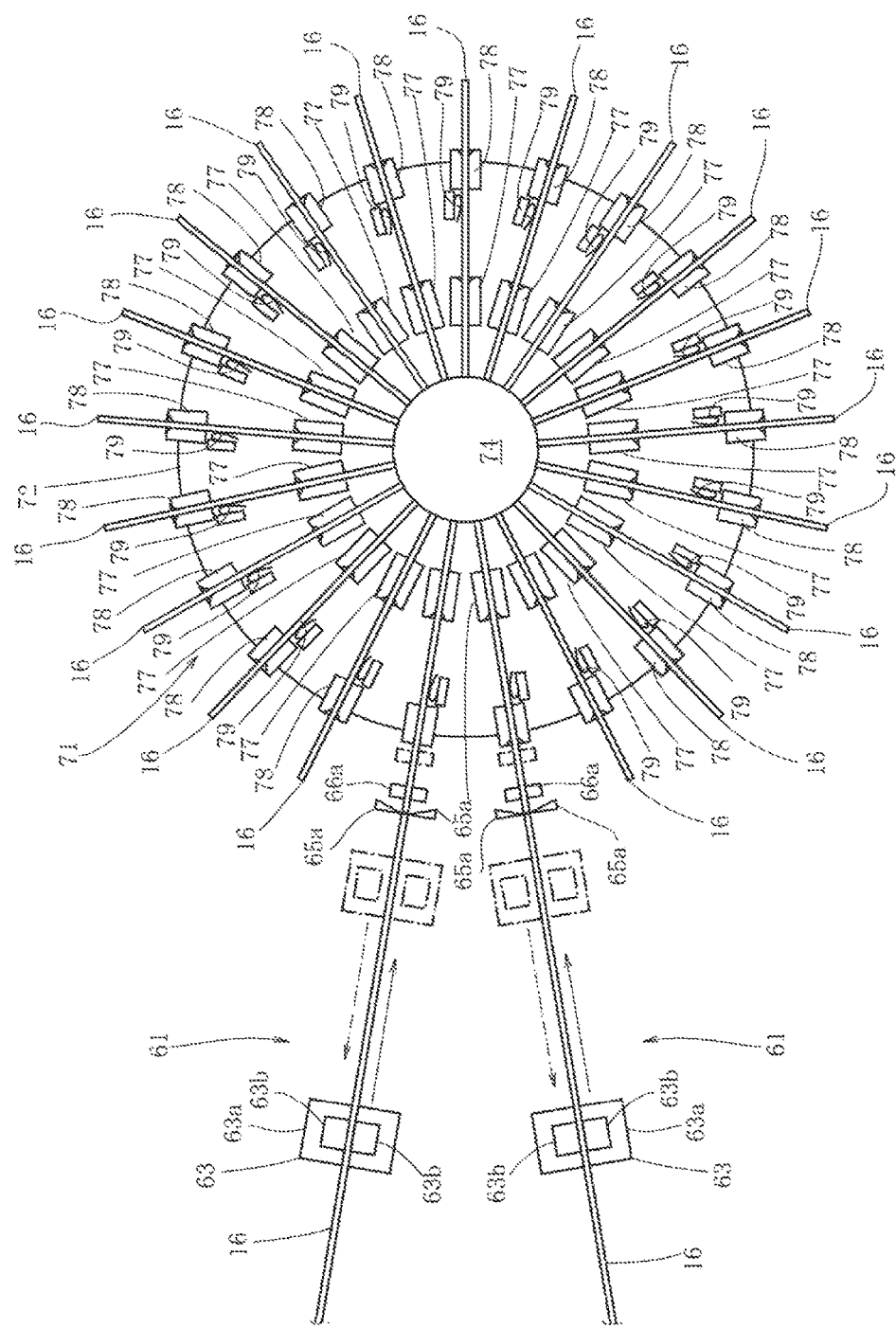
FIG. 2 is a cross sectional view taken along line II-II in FIG. 1, showing a wire storing mechanism.

The chuck mechanism 63 has a body 63a that is attached to the movable base 64c, and a pair of holding pieces 63b, 63b projected upwards from the body 63a to hold the wire 16 (FIG. 2). When the servomotor 64d of the wire transfer actuator 64 is driven and the screw shaft 64b rotates, the movable base 64c screwed onto the screw shaft 64b moves along the longitudinal direction of the screw shaft 64b. By having the chuck mechanism 63 that moves together with the movable base 64c hold the wire 16, the wire 16 is drawn out from the spool 17 in accordance with the amount of movement of the movable base 64c.

The nipper device 65 provided on the edge of the wire transfer actuator 64 on the winding mechanism 21 side has normally-open cutting blades 65a, 65a (FIG. 2) that close due to air pressure. With the movement of the chuck mechanism 63, the wire 16 drawn out by a predetermined length is cut by the pair of the cutting blades 65a, 65a.

On the winding mechanism 21 side of the nipper device 65, a wire holding transfer device 66 is provided, which wire holding transfer device holds the wire 16 cut by the nipper device 65 and separates it from the nipper device 65. The wire holding transfer device 66 holds the wire 16 that is drawn out beyond the nipper device 65 due to the movement of the chuck mechanism 63. The nipper device 65 cuts the wire 16 between the wire holding transfer device 66 and the chuck mechanism 63.

As shown in FIG. 2, the wire holding transfer device 66 has a pair of sandwiching pieces 66a, 66a that holds, at the time of cutting, the wire 16 projected from the nipper device 65 on the winding mechanism 21 side, that is to say, the wire 16 drawn out by a predetermined length. The wire holding transfer device 66 further has a fluid pressure cylinder 66c that operates to separate the pair of sandwiching pieces 66a, 66a holding the wire 16 from the nipper device 65, after the wire 16 is cut by the nipper device 65.

In the present embodiment, the wire 16 is a coated lead wire. Therefore, the wire drawing and cutting mechanism 61 is provided with a coating removal device 67 that removes the coating on the drawn wire 16. The coating removal device 67 includes a commercially available coating remover 67a that removes the coating with a rotating blade, and a coating removal actuator 67b for causing the coating remover 67a to move.

The coating removal actuator 67b is identical in arrangement to the wire transfer actuator 64 for transferring the chuck mechanism 63. The coating remover 67a is movable in an extending direction of the wire 16 by the coating removal actuator 67b. The coating removal actuator 67b is provided between the wire transfer actuator 64 and the stretcher 62. The coating remover 67a removes the coating just by the amount of movement caused by the coating removal actuator 67b.

The winding device 20 further includes a wire storing mechanism 71 that collects the same number of the wires 16 in the predetermined length obtained by the wire drawing and cutting mechanism 61 as that of the nozzles 22 of the winding mechanism 21 and radially disposes the wires, and a wire conveyance mechanism 81 that conveys the plurality of wires 16 disposed radially in the wire storing mechanism 71 from the wire storing mechanism 71 to the plurality of nozzles 22 of the winding mechanism 21.

Figure 4:
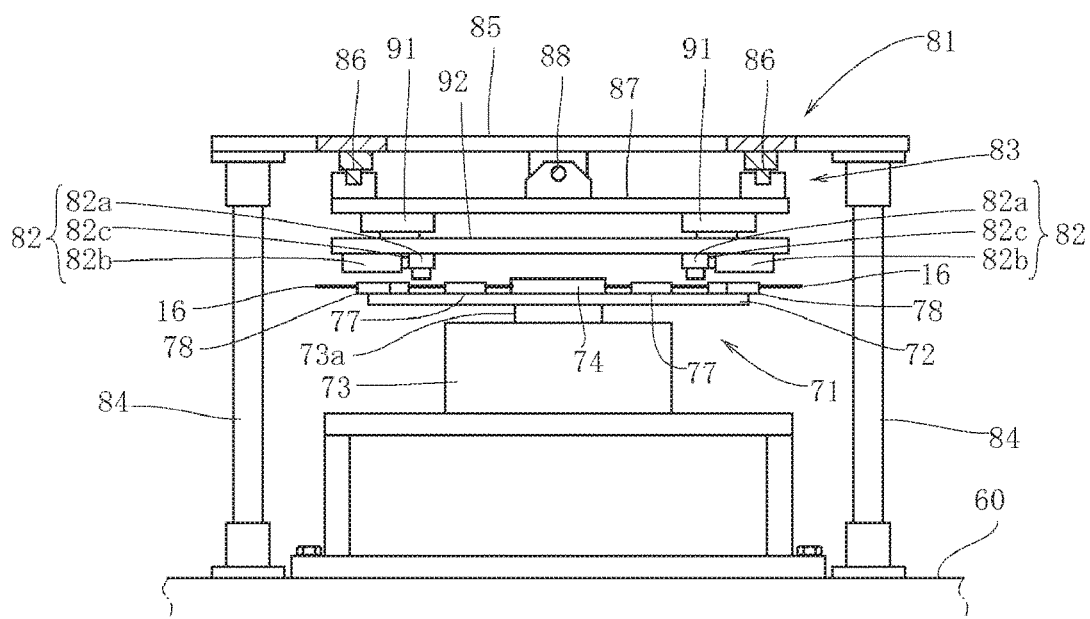
FIG. 4 is a cross sectional view taken along line IV-IV in FIG. 1, showing a relationship between the wire storing mechanism and the wire conveyance mechanism.

As shown in FIG. 1, FIG. 2 and FIG. 4, the wire storing mechanism 71 includes a disk 72 and an index motor 73 that causes the disk 72 to rotate. The index motor 73 is provided on the box base 60 between the wire drawing and cutting mechanism 61 and the winding mechanism 21. The index motor 73 is attached to the box base 60 in a state in which a rotating shaft 73a is protruding upwards, and the disk 72 is attached on the rotating shaft 73a along the same axis. A cylinder member 74 is provided on the center of the disk 72. Holding mechanisms 77 and 78 that hold the plurality of wires 16 of the same number as that of the nozzles 22 are disposed radially, having the cylinder member 74 serve as its center.

As shown in FIG. 2, the holding mechanisms 77 and 78 include an inner supporting member 77 provided on the cylinder member 74 side and an outer supporting member 78 provided on an outer circumferential side of the disk 72. The inner supporting member 77 and outer supporting member 78 are disposed radially about the cylinder member 74 that serves as the center. The wires 16 whose tips are in contact with the outer circumferential surface of the cylinder member 74 are held by the two locations, the inner supporting member 77 and the outer supporting member 78.

The inner supporting member 77 and the outer supporting member 78 are of identical arrangements, and the inner supporting member 77 and the outer supporting member 78 have grooves formed thereon for holding the wires 16. Each of the grooves on the outer circumferential side of the disk 72 has a tapered section formed, where a width of the groove widens as it approaches the outer circumference. The wires 16 are guided into the grooves of the inner supporting member 77 and the outer supporting member 78 by these tapered sections.

The disk 72 in the vicinity of the outer supporting member 78 has plate springs 79 that are elastically in contact with the wires 16 between the inner supporting member 77 and the outer supporting member 78 from the horizontal direction. The plate spring 79 is elastically in contact with the wire 16 and prevents the movement of the wire 16 suspended between the inner supporting member 77 and outer supporting member 78 in the longitudinal direction.

In the present embodiment, two wire drawing and cutting mechanisms 61 are provided. The wire storing mechanism 71 disposes in a radial manner the wires 16 of the same number as that of the nozzles 22, the wires having a predetermined length obtained by the two wire drawing and cutting mechanisms 61.

That is to say, as shown in FIG. 2, the two wire drawing and cutting mechanisms 61 draw out the wires 16 of a predetermined length to the two of the holding mechanisms 77 and 78 that are adjacent thereto in the circumferential direction. After the wires 16 are held by the two holding mechanisms 77 and 78 that are adjacent in the circumferential direction, the index motor 73 (FIG. 1) causes the disk 72 to rotate and make two holding mechanisms 77 and 78 that are adjacent in the circumferential direction and do not hold the wires 16 to newly face the two wire drawing and cutting mechanisms 61. The two wire drawing and cutting mechanisms 61 then draw out the wires 16 of a predetermined length to the newly faced two holding mechanisms 77 and 78 that are adjacent in the circumferential direction.

This is repeated so that the wire storing mechanism 71 radially disposes the wires 16 having the predetermined length obtained by the two wire drawing and cutting mechanisms 61, of the same number as that of the nozzles 22.

As shown in FIG. 1, FIG. 3, FIG. 4, and FIG. 6, the wire conveyance mechanism 81 conveys the plurality of wires 16 radially disposed on the disk 72 of the wire storing mechanism 71, from the wire storing mechanism 71 to the winding mechanism 21. The wire conveyance mechanism 81 has a holding device 82 that simultaneously holds the radially disposed plurality of wires 16, and a transfer device 83 that transfers the plurality of wires 16 held by the holding device 82 to the winding mechanism 21.

Figure 3:
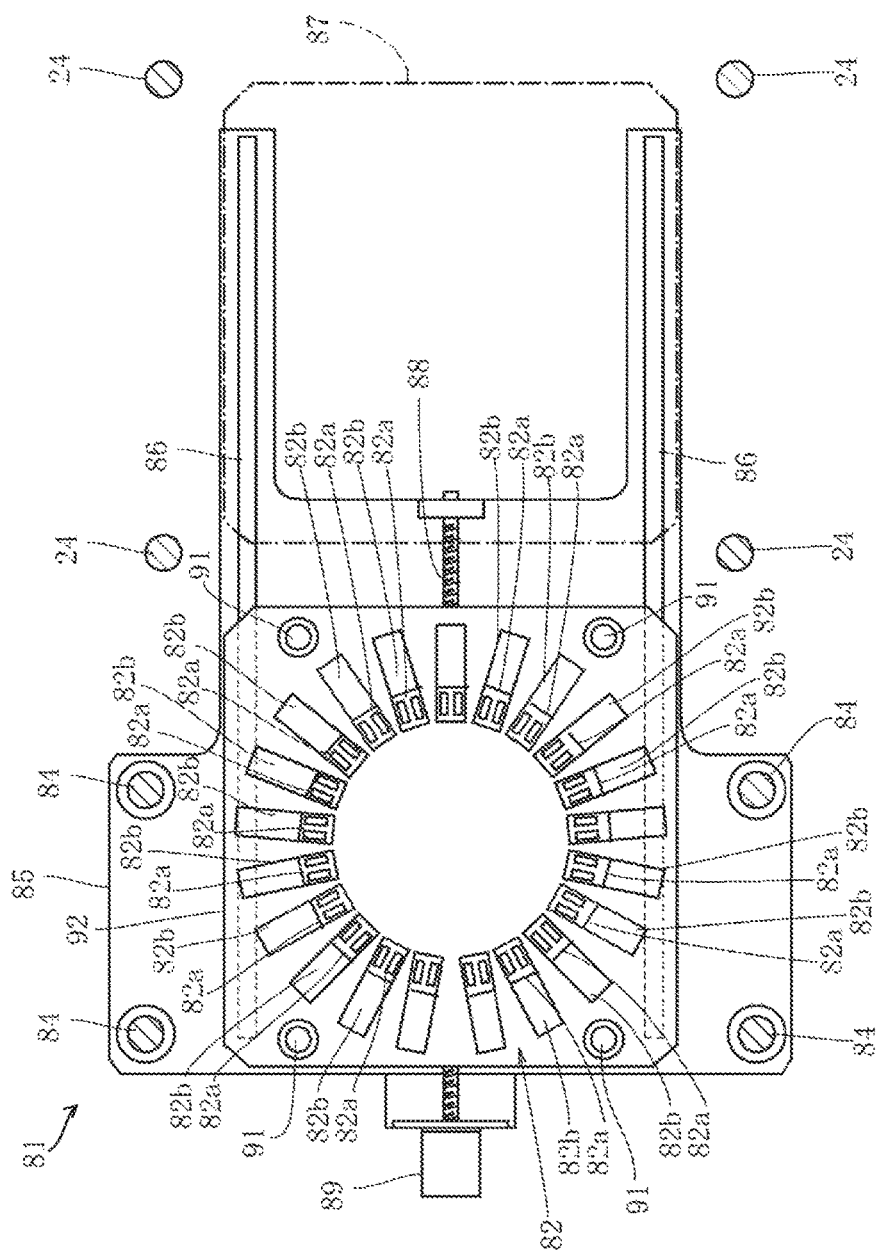
FIG. 3 is a cross sectional view taken along line in FIG. 1, showing a wire conveyance mechanism.

As shown in FIG. 3 and FIG. 4, the transfer device 83 includes an extension plate 85 provided horizontally on the disk 72 by four perpendicular support rods 84 provided on the box base 60 in a manner surrounding the disk 72. The extension plate 85 is provided extending from above the disk 72 to above the horizontal substrate 23 of the winding mechanism 21. The lower surface of the extension plate 85 has rails 86 attached thereon that extend from above the disk 72 to above the horizontal substrate 23 of the winding mechanism 21. The rails 86 is set with a movable plate 87, and a ball screw 88 that screws on the movable plate 87 is provided on the lower surface of the extension plate 85.

The extension plate 85 has a drive motor 89 attached thereto, which drive motor causes rotation of the ball screw 88. By making the ball screw 88 rotate forwards or backwards by the drive motor 89, the movable plate 87 reciprocally moves between from above the disk 72 to above the horizontal substrate 23.

The lower surface of the movable plate 87 has a lifting plate 92 attached thereto via a fluid pressure cylinder 91. The lifting plate 92 has the holding device 82 provided thereto. The lifting plate 92 is lifted and lowered by the fluid pressure cylinder 91.

As shown in FIG. 3 and FIG. 4, the holding device 82 includes a plurality of chuck cylinders 82a that simultaneously holds a plurality of wires 16 radially disposed, and a radial cylinder 82b that causes the chuck cylinders 82a to move in the radial direction. The radial cylinder 82b is attached on the lower surface of the lifting plate 92 so that the rod 82c faces the inner circumferential side. The chuck cylinder 82a is attached to the rod 82c of the radial cylinder 82b.

When the lifting plate 92 is lowered, the chuck cylinder 82a enters between the inner supporting member 77 and outer supporting member 78 of the wire storing mechanism 71. Upon lifting the lifting plate 92 in a state in which the chuck cylinder 82a holds the wire 16, the wire 16 is lifted up against the energizing force of the plate spring 79 of the wire storing mechanism 71.

Subsequently, by rotating the ball screw 88 by the drive motor 89, the movable plate 87 is moved from above the disk 72 to above the horizontal substrate 23 of the winding mechanism 21 together with the lifting plate 92. The plurality of wires 16 disposed radially in the wire storing mechanism 71 is conveyed to the plurality of nozzles 22 as such.

Next described is a winding method using the winding device 20. The operations carried out in the winding device 20 are automatically controlled by a controller not shown, which controller is installed inside the box base 60. The winding method of the present embodiment is an improvement of the winding method of simultaneously drawing out the wires 16 of the same number as the number of the teeth 11 from the plurality of radially positioned nozzles 22 to corresponding slots 12 between respective teeth 11, and simultaneously winding the wires 16 between two predetermined slots 12 that correspond to the respective nozzles 22.

Its feature is that the following steps are carried out: a wire storage step for radially disposing wires 16 of a predetermined length required for the winding, and storing the wires up to the same number as that of the plurality of nozzles 22 during the winding, and a wire conveyance step for conveying the plurality of wires 16 radially disposed in the wire storage step to the plurality of nozzles 22 after the winding of the wires 16 is terminated. In the present embodiment that uses a coated lead wire as the wire 16, coating removal is carried out in the wire storage step to remove the coating of the wire 16 composed of the coated lead wire. Each of the steps is described in detail below.

<Wire Storage Step>

In the wire storage step, the wires 16 of a predetermined length are radially disposed and are stored until its number reaches the same number as that of the nozzles 22. The predetermined length of the wires 16 is a length required in a case in which a single nozzle 22 is used to wind the wires 16 around the rotor 10 being the winding target. The wires 16 of the predetermined length can be obtained by the wire drawing and cutting mechanism 61, and the wires 16 of the predetermined length are stored by the wire storing mechanism 71.

As shown in FIG. 2, the two wire drawing and cutting mechanisms 61 are provided radially on the disk 72 of the wire storing mechanism 71, and draw out the wires 16 of the predetermined length to the two holding mechanisms 77 and 78 that are adjacent in the circumferential direction. A drawn-out wire 16 passes through a groove of a respective outer supporting member 78 and a groove of a respective inner supporting member 77 provided on the disk 72, and is made into contact with the outer circumferential surface of the cylinder member 74.

The wire 16 suspended between the respective outer supporting member 78 and inner supporting member 77 is made into contact with the plate spring 79 from the horizontal direction, which thus prevents the movement of the wire 16 along the longitudinal direction.

Coating removal is carried out simultaneously upon drawing out the wire 16, to remove a portion of the coating of the wire 16 composed of the coated lead wire. The removal of the coating is carried out to a part in which the wire 16 of the predetermined length requires to be electrically connected in a wound state to the rotor 10. The removal of the coating is carried out by an operation of the coating remover 67a while the coating remover 67a is moved within a predetermined range by the coating removal actuator 67b.

The wire drawing and cutting mechanism 61 that draws out the wire 16 of the predetermined length cuts the drawn-out wire 16 with the nipper device 65. The wire holding transfer device 66 of the wire drawing and cutting mechanism 61 holds the wire 16 cut by the nipper device 65 and separates it from the nipper device 65 in the horizontal direction. The wire holding transfer device 66 transfers the wire 16 until a tip of the wire is in contact with the outer circumferential surface of the cylinder member 74 against the energizing force of the plate spring 79. As a result, the wire 16 of the predetermined length is held by the two holding mechanisms 77 and 78 that are adjacent in the circumferential direction of the disk 72 of the wire storing mechanism 71.

After the wire 16 of the predetermined length is held by the two holding mechanisms 77 and 78 that are adjacent in the circumferential direction of the disk 72, the index motor 73 causes the disk 72 to rotate, to make the two holding mechanisms 77 and 78 that are adjacent in the circumferential direction to face two new wire drawing and cutting mechanisms 61.

The two wire drawing and cutting mechanisms 61 draw out the wire 16 of the predetermined length with respect to the newly facing two holding mechanisms 77 and 78 that are adjacent in the circumferential direction and cut the wire. The wire holding transfer device 66 holds the cut wire 16 of the predetermined length and separates it from the nipper device 65, and makes the tip of the wire 16 is in contact with the cylinder member 74.

This operation is repeated to radially dispose the wires 16 of the predetermined length obtained by the two wire drawing and cutting mechanisms 61 and store the wires 16 until the same number as the that of the nozzles 22 is reached, as shown in FIG. 2.

In particular, the wire holding transfer device 66 causes the tip of the plurality of wires 16 to be in contact with the outer circumferential surface of the cylinder member 74. As a result, the plurality of wires 16 are disposed radially without any displacement in position from the center.

<Wire Conveyance Step>

In this step, the plurality of wires 16 disposed radially in the wire storage step is conveyed to the plurality of nozzles 22 by the wire conveyance mechanism 81.

First, the movable plate 87 is positioned above the disk 72, and the lifting plate 92 is lowered by the fluid pressure cylinder 91.

The chuck cylinder 82a is entered between the inner supporting member 77 and the outer supporting member 78 of the wire storing mechanism 71, and the wire 16 is held by the chuck cylinder 82a. Thereafter, the lifting plate 92 is lifted in a state in which the chuck cylinder 82a holds the wire 16, and the wire 16 is lifted against the energizing force of the plate spring 79 of the wire storing mechanism 71.

Thereafter, the ball screw 88 is rotated by the drive motor 89, thus moving the movable plate 87 from above the disk 72 to above the horizontal substrate 23 of the winding mechanism 21 together with the lifting plate 92.

The plurality of chuck cylinders 82a provided on the lifting plate 92 holds the plurality of wires 16 in a state in which the wires are radially disposed. Thus, the plurality of wires 16 is guided to above the plurality of nozzles 22 in a radially disposed state. At this state, the chuck cylinders 82a are positioned on an outer circumferential side of the disk 72 by the radial cylinders 82b, and hold the wires 16 in this state.

Figure 8:
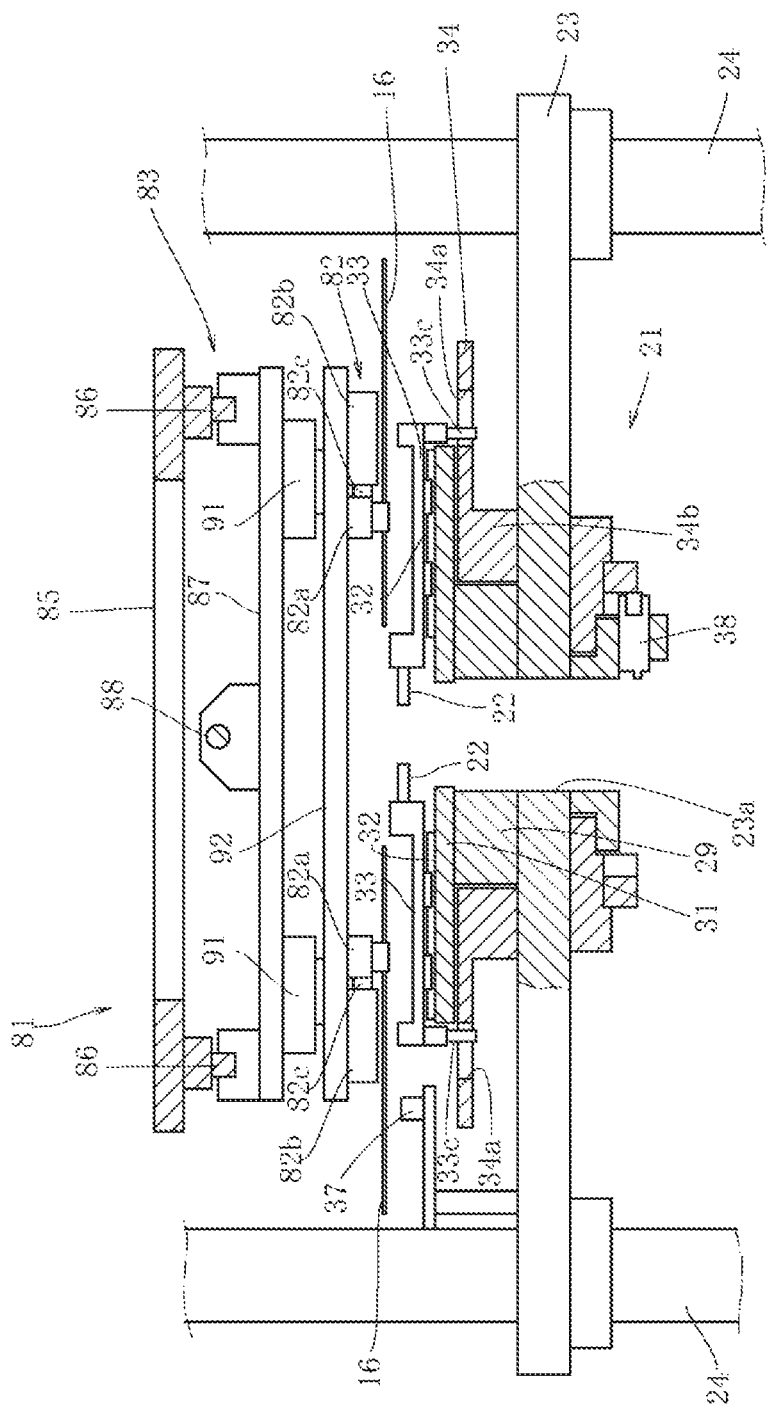
FIG. 8 is a view corresponding to FIG. 7, showing a state in which wires are conveyed to positions above a plurality of nozzles by a wire conveyance mechanism.

In the winding mechanism 21 side, as shown in FIG. 8, the cam plate 34 is rotated by the nozzle drive motor 36, and the radially provided plurality of movable stands 33 are moved to the center side. This allows for ensuring a larger inner edge circle drawn by inner edges of the radially disposed plurality of wires 16 than an outer edge circle drawn by outer edges of the plurality of nozzles 22, that is to say inlets of the wire 16 of the plurality of nozzles 22.

Figure 9:
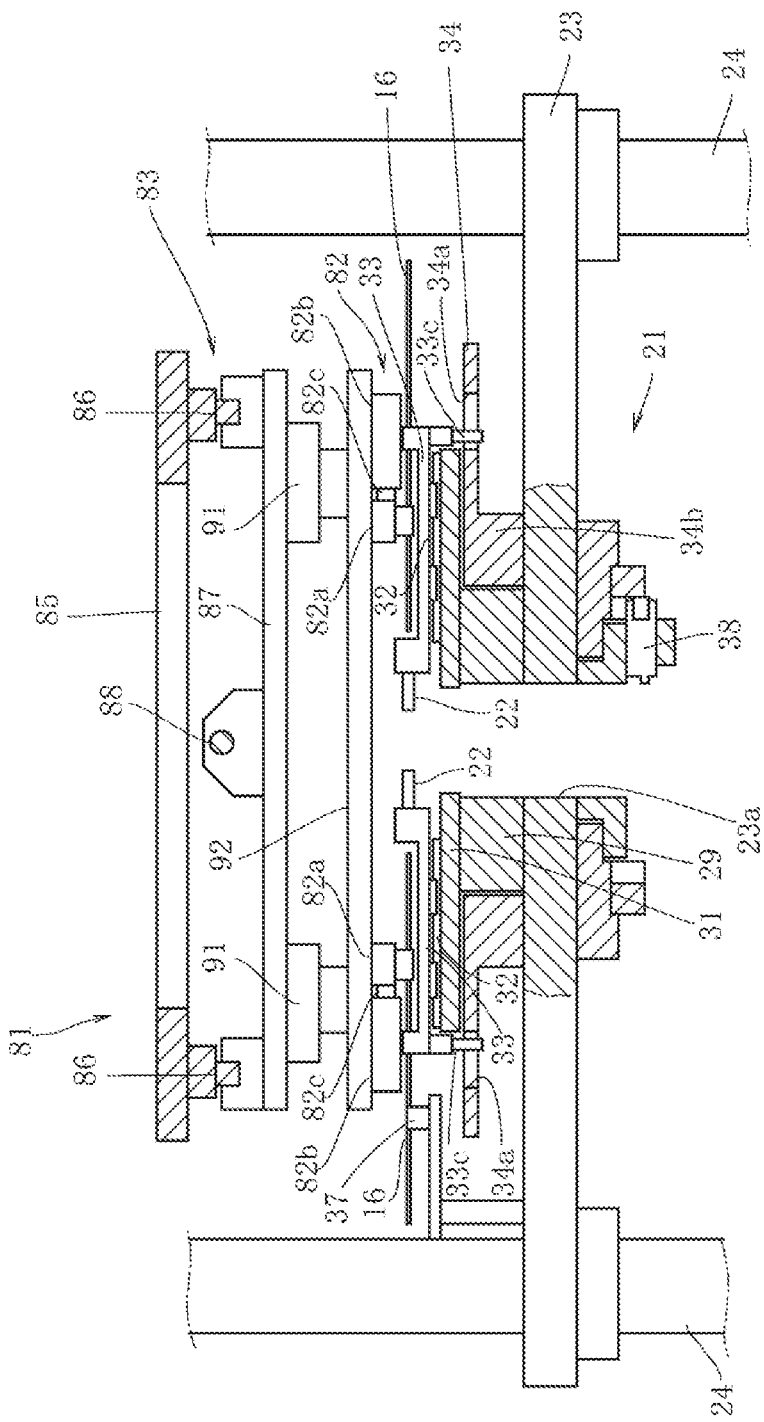
FIG. 9 is a view corresponding to FIG. 7, showing a state in which wires are conveyed along extension lines of the plurality of nozzles by the wire conveyance mechanism.

In this state, the fluid pressure cylinder 91 of the wire conveyance mechanism 81 lowers the lifting plate 92 together with the wires 16, and as shown in FIG. 9, positions each of the wires 16 on extended lines of a respective one of the nozzles 22.

Figure 10:
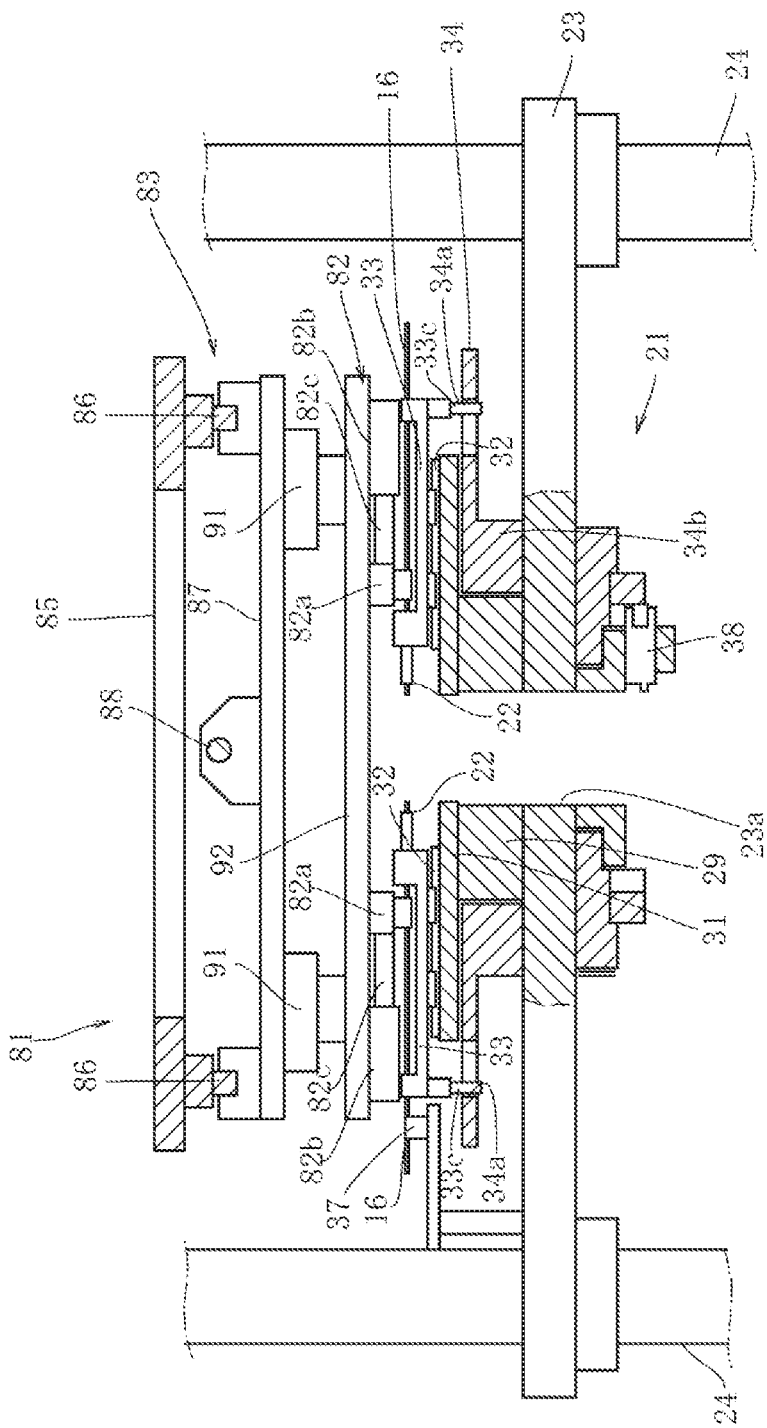
FIG. 10 is a view corresponding to FIG. 7, showing a state in which wires are inserted into a plurality of nozzles by a wire conveyance mechanism.

Subsequently, as shown in FIG. 10, the cam plate 34 is rotated by the nozzle drive motor 36 and the radially provided plurality of movable stands 33 are moved to the outer circumferential side. Further, the chuck cylinders 82a holding the wires 16 are moved to the central side by the radial cylinders 82b, to insert the radially disposed wires 16 to the respective nozzles 22.

Figure 11:
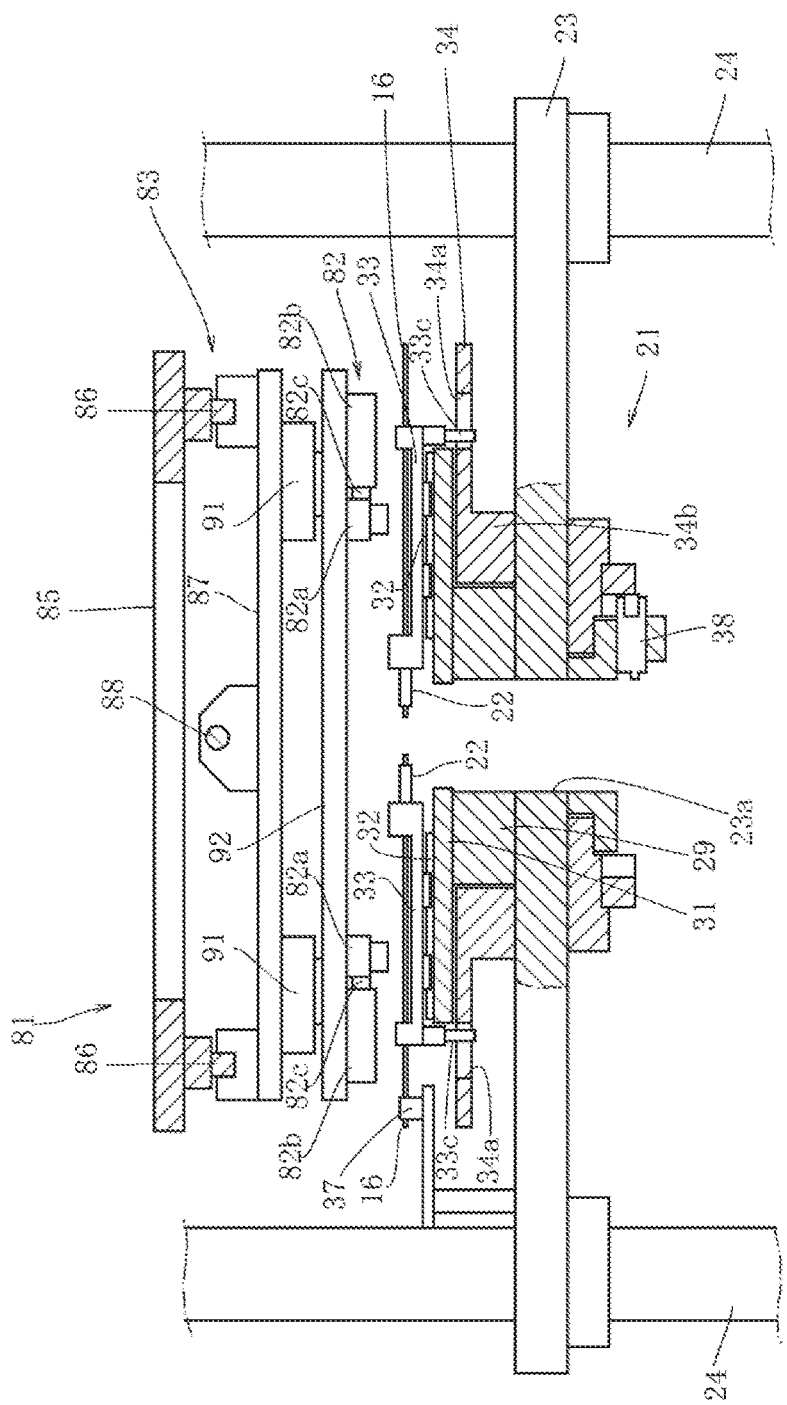
FIG. 11 is a view corresponding to FIG. 7, showing a lifted state of the wire conveyance mechanism after the wires have been inserted into the plurality of nozzles.

The wires 16 held by the chuck cylinders 82a are then released, which causes the lifting plate 92 to be lifted by the fluid pressure cylinder 91 in the wire conveyance mechanism 81 as shown in FIG. 11, to place the lifting plate 92 back to above the disk 72 of the wire storing mechanism 71 together with the movable plate 87. As such, the movable plate 87 and lifting plate 92 avoid obstructing in the winding step of the winding mechanism 21.

<Winding Step>

In this step, the wires 16 are simultaneously drawn out from the plurality of radially provided nozzles 22 of the same number as that of the teeth 11 being the winding target to corresponding slots 12 between respective teeth 11, and the wires 16 are simultaneously wound between predetermined two slots 12 that correspond to respective nozzles 22.

As shown in FIG. 12, the winding target is the rotor 10 used in the motor, and has twenty or more teeth 11 that are provided projecting radially around the rotating shaft. The rotor 10 has a holding section 13 formed so as to contain winding start sections and winding end sections of the wires 16.

The rotor 10 being the winding target is installed on the support base 41 in the rotor carrying mechanism 40 in a state in which the holding section 13 becomes upper side of the rotor. The arms 42 are rotated by the carrying motor 43 to carry the rotor 10 below the round hole 31a of the attachment disk 31 in a state supported by the support base 41.

Thereafter, the lifting rod 46 of the rotor lift mechanism 45 is lifted, to mount the support base 41 and the rotor 10 on the upper end of the lifting rod 46. Furthermore, by lifting the lifting rod 46, as shown in FIG. 7, the rotor 10 passes through the round hole 31a and moves to a position surrounded by the plurality of nozzles 22.

On the other hand, the rotor supporting mechanism 50 holds down the upper part of the lifted rotor 10 from above with a pressing member 53 to fix the position of the rotor 10 in a perpendicular direction, and prevents that position from shifting. At the same time, the pressing member 53, as shown in FIG. 12, clips winding start sections of the wires 16 drawn out from the plurality of nozzles 22, and determines the winding start position of the wires 16.

Thereafter, the rotor 10 is lifted together with the pressing member 53 and the cam plate 34 is rotated by the nozzle drive motor 36 to reduce or enlarge a circle drawn by the tip parts of the radially provided plurality of nozzles 22. The wires 16 are then simultaneously drawn out from the plurality of nozzles 22 to the slots 12 between respective teeth 11 to simultaneously wind the wires 16 between predetermined two slots 12 that correspond to respective nozzles 22.

More specifically, first, the rotor 10 is lifted while appropriately moving the radially provided plurality of nozzles 22 along the rail 32 to insert the winding start sections 16a around the holding section 13 and thereafter simultaneously draw out the wires 16 to the slots 12 between the teeth 11, as shown in FIG. 12.

Thereafter, the rotor 10 is rotated about the shaft to change the slot 12 that the nozzle 22 faces. The rotor 10 is lowered while appropriately moving the plurality of nozzles 22 along the rail 32, and as shown in FIG. 13, the wires 16 are simultaneously drawn out to slots 12 between respective teeth 11. The winding end sections 16b of the wires are thereafter inserted around the holding section 13. As such, the wires 16 projected downwards from the slots 12 are folded over and inserted into another one of respective slots 12. The folded over wires 16 form the crossover lines 16c.

As such, when the wires 16 are simultaneously drawn out from the plurality of nozzles 22 and are wound to form the crossover lines 16c, as shown in FIG. 14, the movement of the plurality of nozzles 22 towards the inner sides of the radial direction allows for the crossover lines 16c to be pressed towards the inner radial direction. This causes the crossover lines 16c to become in a state intertwined while being gradually displaced toward the inner radial direction. Therefore, the expansion of the crossover lines 16c is prevented, thereby allowing for the improvement in the space factor of the winding.

Thereafter, the winding start sections 16a and the winding end sections 16b of the wires 16 contained in the holding section 13 are caulked by the holding section 13 with a calking member 38. This as a result prevents the disengagement of the winding start sections 16a and the winding end sections 16b of the wires 16.

After the winding start sections 16a and the winding end sections 16b of the wires 16 are caulked to the holding section 13, the clipping of the initially wound wires 16a by the pressing member 53 of the rotor supporting mechanism 50 is released, and the pressing member 53 is lifted to release the holding down of the upper part of the rotor 10. The lifting rod 46 is then lowered and the rotor 10 is lowered together with the support base 41. Thereafter, the arms 42 whose tip has the support base 41 mounted is rotated to take off the wound rotor 10, and the series of the winding operation is terminated. By mounting the rotor 10 for a subsequent winding to the support base 41 on the tip of another arm 42 at this time, it is possible to have the lifting rod 46 support a rotor 10 to wind, simultaneously to taking off the rotor 10 whose winding is completed.

Further, in the winding method of the present invention, a feature thereof is to carry out the wire storage step simultaneously to the winding step. That is to say, while the wire 16 is being wound, the wires 16 of the predetermined length required for the winding are radially disposed and are stored up to the same number as that of the plurality of nozzles 22. Then, after the winding of the wires 16, by conveying the wires 16 of the same number as that of the radially disposed plurality of nozzles 22 to the plurality of nozzles 22, the winding can be carried out relatively rapidly.

Further, the winding device 20 and the winding method of the present invention includes the wire drawing and cutting mechanism 61 that draws out the wire from a single spool 17 and cuts the drawn out wire 16 at a predetermined length, and the wire conveyance mechanism 81 that conveys the plurality of wires 16 obtained as such to the plurality of nozzles 22. This thus requires no spools 17 and stretchers 62 of the same number as that of the nozzles 22. Therefore, as compared to the prior art that requires the same number of spools 17 and stretchers 62 as the nozzles 22, the device is reduced in size and wide installation area is not required.

Here, in a case in which the time taken for the winding step is short and the number of wires 16 of the predetermined length prepared by the single wire drawing and cutting mechanism 61 does not reach the number of the nozzles 22 within that time, a plurality of the wire drawing and cutting mechanisms 61 are provided. By radially disposing the wires 16 of the predetermined length supplied from the plurality of the wire drawing and cutting mechanisms 61 and storing up to the same number as the nozzles 22, the wire storing mechanism 71 is capable of securely preparing the number of wires 16 equal to the number of nozzles 22 within the time taken for the winding step. It is possible to reduce the number of the wire drawing and cutting mechanisms 61 as compared to the number of the nozzles 22 even in this case also, so the device will be reduced in size and wide installation area is not required.

The wires 16 wound around the rotor 10, which wires are composed of the coated lead wire, are to be connected to a bus bar not illustrated. By removing the coating on parts to which the bus bar will be connected with the coating removal device 67 when the wires 16 are drawn out by the wire drawing and cutting mechanism 61, the connection work to the bus bar can be carried out relatively easily.

Although the foregoing embodiment described a case of storing the wires 16 obtained by two wire drawing and cutting mechanisms 61, the number of the wire drawing and cutting mechanisms 61 is not limited to two. For example, if the time taken for the winding step is relatively long and the number of wires 16 prepared by a single wire drawing and cutting mechanism 61 reaches the number of the nozzles 22 within that time, the wire drawing and cutting mechanism 61 may be one. Moreover, in a case in which the time required for the winding step is extremely short, three or four wire drawing and cutting mechanisms 61 may be provided, and the wires 16 obtained by these may be stored.

The embodiments of the present invention described above are merely illustration of some application examples of the present invention and not of the nature to limit the technical scope of the present invention to the specific constructions of the above embodiments.

The present application claims a priority based on Japanese Patent Application No. 2013-156209 filed with the Japan Patent Office on Jul. 28, 2013, all the contents of which are hereby incorporated by reference.

The invention claimed is:

1. A winding device including radially disposed nozzles of a same number as a number of teeth, a plurality of the nozzles simultaneously drawing out a wire to corresponding slots between respective teeth to simultaneously wind the wire between predetermined two slots that correspond to a respective one of the nozzles, the winding device comprising:

a wire drawing and cutting mechanism configured to draw out the wire from a single spool and cut the drawn-out wire at a predetermined length;

a wire storing mechanism configured to dispose the wire of the predetermined length obtained by the wire drawing and cutting mechanism in a radial manner and store the wire of the same number as that of the plurality of nozzles; and a wire conveyance mechanism configured to convey the radially disposed plurality of wires from the wire storing mechanism to the plurality of nozzles.

2. The winding device according to claim 1, wherein a plurality of wire drawing and cutting mechanisms are provided; and the wire storing mechanism is configured to radially dispose a wire of a predetermined length obtained by the plurality of the wire drawing and cutting mechanisms and store the wire of the same number as that of the plurality of nozzles.

3. The winding device according to claim 1, wherein the wire is a coated lead wire; and the wire drawing and cutting mechanism has a coating removal device configured to remove a coating of the wire drawn out.

4. A winding method comprising:

Providing the winding device of claim 1;

a wire storage step of radially disposing wires drawn out from a single spool and cut at a predetermined length required for the winding, and storing the wires of the same number as that of the plurality of the nozzles, while the wires are being wound; and a wire conveyance step of conveying a plurality of the wires stored in the wire storage step to the plurality of nozzles, after the wires are wound.

5. The winding method according to claim 4, wherein in the wire storage step, removal of a coating is carried out to remove the coating of the wires that are coated lead wires.

* * * * *